(12) United States Patent
Long et al.

(10) Patent No.: US 10,956,295 B1
(45) Date of Patent: Mar. 23, 2021

(54) AUTOMATIC RECOGNITION FOR SMART DECLARATION OF USER INTERFACE ELEMENTS

(71) Applicant: SAP SE, Walldorf (DE)

(72) Inventors: Philippe Long, Paris (FR); Alexandre Fortin, Paris (FR)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/802,144

(22) Filed: Feb. 26, 2020

(51) Int. Cl.
*G06F 11/34* (2006.01)
*G06F 9/451* (2018.01)

(52) U.S. Cl.
CPC .......... *G06F 11/3438* (2013.01); *G06F 9/451* (2018.02)

(58) Field of Classification Search
CPC ............................ G06F 11/3438; G06F 9/451
See application file for complete search history.

(56) References Cited

U.S. PATENT DOCUMENTS

| | | | | |
|---|---|---|---|---|
| 8,909,950 B1* | 12/2014 | Levchuk | ............... | G06N 20/00 713/300 |
| 9,237,232 B1* | 1/2016 | Williams | ............... | G10L 17/04 |
| 9,965,725 B1* | 5/2018 | Levchuk | ............... | G06F 1/3203 |
| 10,289,296 B1* | 5/2019 | Zhang | ............... | G06F 16/9574 |
| 2007/0189499 A1* | 8/2007 | Martine | ............. | H04M 1/27485 379/355.01 |
| 2012/0293423 A1* | 11/2012 | Dai | ................... | G06K 9/00436 345/173 |
| 2014/0089904 A1* | 3/2014 | Wray | .................. | G06F 11/3672 717/135 |
| 2015/0100524 A1* | 4/2015 | Pantel | ................ | G06F 3/04842 706/12 |
| 2015/0186756 A1* | 7/2015 | Fujii | .................... | G06K 9/4604 382/229 |
| 2016/0343375 A1* | 11/2016 | Williams | ............ | H04M 3/5166 |
| 2017/0017303 A1* | 1/2017 | Nakasu | .................. | G06F 3/017 |
| 2017/0308290 A1* | 10/2017 | Patel | .................. | G06F 3/04817 |
| 2018/0025657 A1* | 1/2018 | Kim | ...................... | G06K 9/6255 434/169 |
| 2018/0349514 A1* | 12/2018 | Alzate Perez | .... | G06F 16/24522 |
| 2019/0179494 A1* | 6/2019 | Colagrosso | .......... | G06F 3/0482 |
| 2019/0235720 A1* | 8/2019 | Zhang | ..................... | G06F 40/14 |
| 2019/0318730 A1* | 10/2019 | Hazarika | ................ | G10L 15/22 |
| 2020/0090485 A1* | 3/2020 | Casse | ................... | A61B 5/4818 |

* cited by examiner

*Primary Examiner* — David E Choi
(74) *Attorney, Agent, or Firm* — Jones Day (57) ABSTRACT

Systems, methods, and computer program products are described herein for automatically recognizing user interface (UI) elements. Capturing, by a first application, of user interactions with a graphical user interface (GUI) of a second application is initiated. The GUI includes a plurality of UI elements. The first application is separate and distinct from the second application. A selection of a UI element is received. The selection is iteratively evaluated against a ranked criteria list having a plurality of criteria to identify whether the selection matches at least one criterion of the plurality of criteria. The selection is appended to the ranked criteria list based on the selection matching the at least one criterion. A second selection of another UI element is received from the second application. The first application automatically appends a criterion to the second selection based on the ranked criteria list.

20 Claims, 7 Drawing Sheets

| Properties | Values |
|---|---|
| ControlType | Button |
| AutomationID | num4Button |
| Name | Four |
| ClassName | Button |
| , | , |

| UI Elements | Criteria |
|---|---|
| 4 | AutomationID=num4Button |
| 2 | AutomationID=num2Button |
| , | , |

AUTOMATIC RECOGNITION FOR SMART DECLARATION OF USER INTERFACE ELEMENTS

TECHNICAL FIELD

The subject matter described herein relates to enhanced techniques for smart declaration of user interface elements.

BACKGROUND

Robotic process automation (RPA) can be used to monitor and automate user performed tasks. With RPA, a computing system can create an action list that records various user interactions with a graphical user interface (GUI). As part of RPA, user interface (UI) elements of an application of a GUI are captured. Those UI elements are analyzed during a capture phase. Each UI element has an associated set of information such as a name, an ID, a location, etc. Depending upon the technology, this set of information can be verbose. Typically, a mainframe application can render very basic screens with characters only while a modern application has a significant amount of information to carry.

A number of various methodologies for identifying and accessing a UI element can be used. For example, UI elements can be identified by focusing on coordinate placement of such elements. This methodology works best for a GUI that has static elements having locations that do not vary. With another methodology, all information relating to the UI elements is kept. UI elements can be accurately identified, but during consumption of these elements, large amounts of information are evaluated. Such processing can require a significant amount of time and/or computing resources. Also, with this methodology, if the information is missing or has changed, the automation no longer functions. This can lead to a need for re-identifying updated and/or translated UI elements.

SUMMARY

In one aspect, a method for automatically recognizing user interface elements includes initiating capture, by a first application, of user interactions with a graphical user interface of a second application is initiated. The graphical user interface includes a plurality of user interface elements. The first application is separate and distinct from the second application. A selection of a user interface element is received. The selection is iteratively evaluated against a ranked criteria list having a plurality of criteria to identify whether the selection matches at least one criterion of the plurality of criteria. The selection is appended to the ranked criteria list based on the selection matching the at least one criterion. A second selection of another user interface element is received from the second application. The first application automatically appends a criterion to the second selection based on the ranked criteria list.

In some variations, a user-defined criterion defining a property and a value can be received. Whether the user-defined criterion matches at least one criterion of the plurality of criteria can be evaluated. Based on the user-defined criterion matching the at least one criterion, a rank associated with the at least one criterion can be increased. Based on the user-defined criterion not matching the at least one criterion, the user-defined criterion can be stored within a temporary storage device.

In other variations, the iteratively evaluating can be done by comparing the selection against a first criterion of the plurality of criteria to determine whether the selection matches the first criterion. Based on the selection not matching the first criterion, it can be evaluated whether the plurality of criteria includes a second criterion. Based on a presence of the second criterion, the selection can be compared to the second criterion to determine whether the selection matches the second criterion.

In some variations, the iteratively evaluating can be done by comparing the selection against a first criterion of the plurality of criteria to determine whether the selection matches the first criterion. Based on the selection not matching the first criterion, it can be evaluated whether the plurality of criteria includes a second criterion. Based on the plurality of criteria not including the second criterion, (i) it can be determined whether a user-defined criterion is available and (ii) based on the user-defined criterion being unavailable, the selection can be annotated as unrecognized.

In other variations, previously generated UI identifications can be bypassed.

In some variations, each of the plurality of user interface elements can include a property and a value associated with the property and each criterion of the plurality of criteria can include a combination of the property and the value.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter simplifies how UI elements are defined. Such simplification can in turn increase the processing speed of automating user actions.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Lean identification is another example methodology for identifying and/or accessing UI elements of a GUI. With lean identification, only relevant criteria are focused on for the GUI. This methodology balances what is needed versus what is not needed for processing information. When the criteria are properly defined, automation can be expedient and minor changes to the UI elements do not hinder the processing. Smart declaration of UI elements can assist a user in defining appropriate criteria for a given UI element. Smart declaration uses an actionable strategy per technology (e.g., UIAutomation, Web, SAP GUI, SAP UI5, etc.). Additional strategies can be implemented for a given application or technology.

Figure 1:
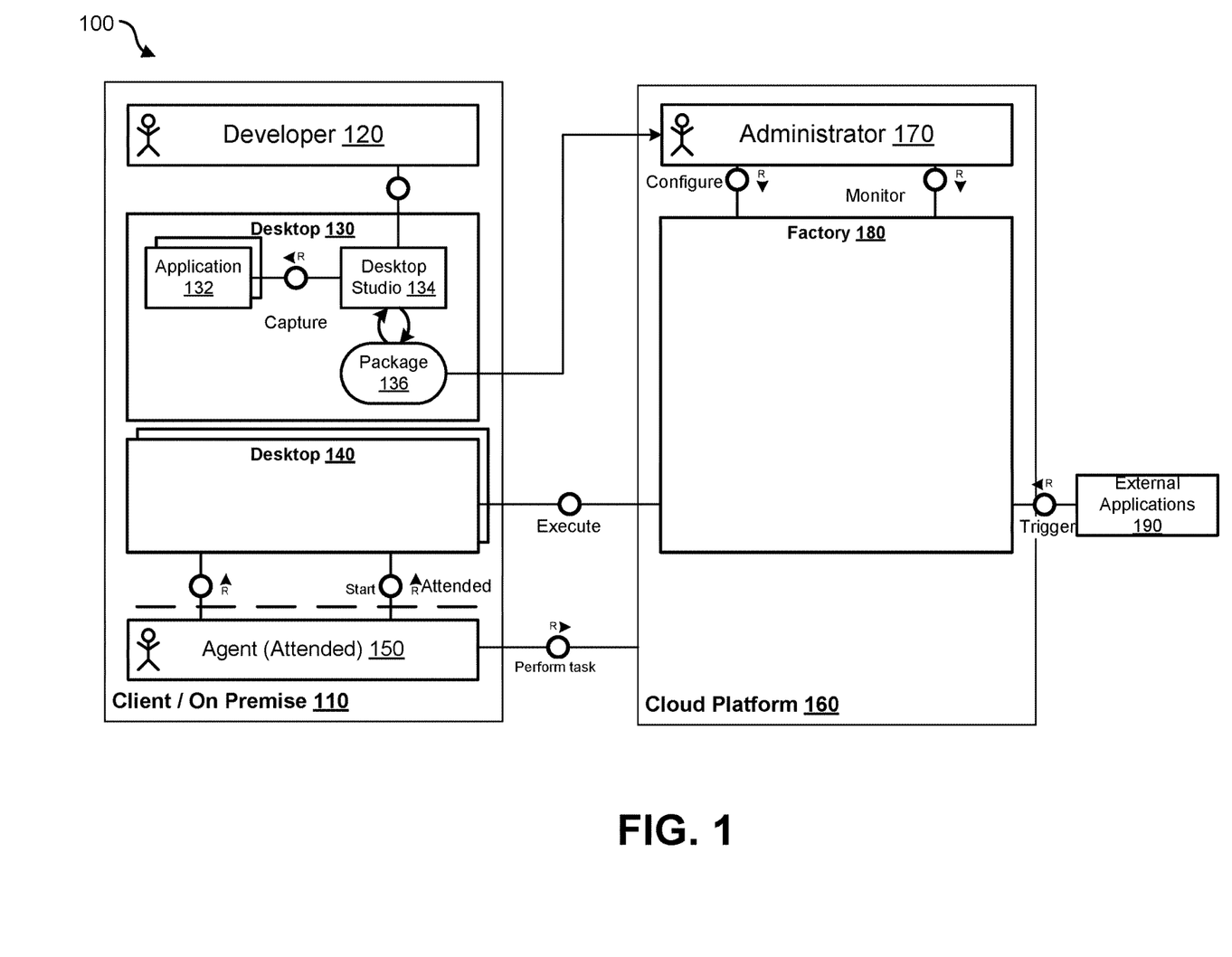
FIG. 1 illustrates a system architecture for application automation.

FIG. 1 illustrates a system architecture 100 for application automation. For application automation, a client system 110 can interface with a cloud platform 160. A developer 120 associated with the client system can capture application screens and/or UI elements of application 132 using a desktop studio 134 of desktop 130. The smart declaration methodology described herein relates to this capture phase between desktop studio 134 and application 132. A package 136 can be generated and sent to an administrator 170 associated with the cloud platform 160. The administrator 170 can monitor and/or configure the package 136 appropriately with use of factory 180 and various components therein (not shown). In some variations, external applications 190 can trigger or notify factory 180 and enable importation of a workable solution. Factory 180 can interface with desktop 140 of client 110 for executing results of a deployed package. Desktop 140 can interface with an agent 150 to interface with the deployed package. Agent 150 can also interface with cloud platform 160 to enable execution of one or more service tasks.

Figure 2:
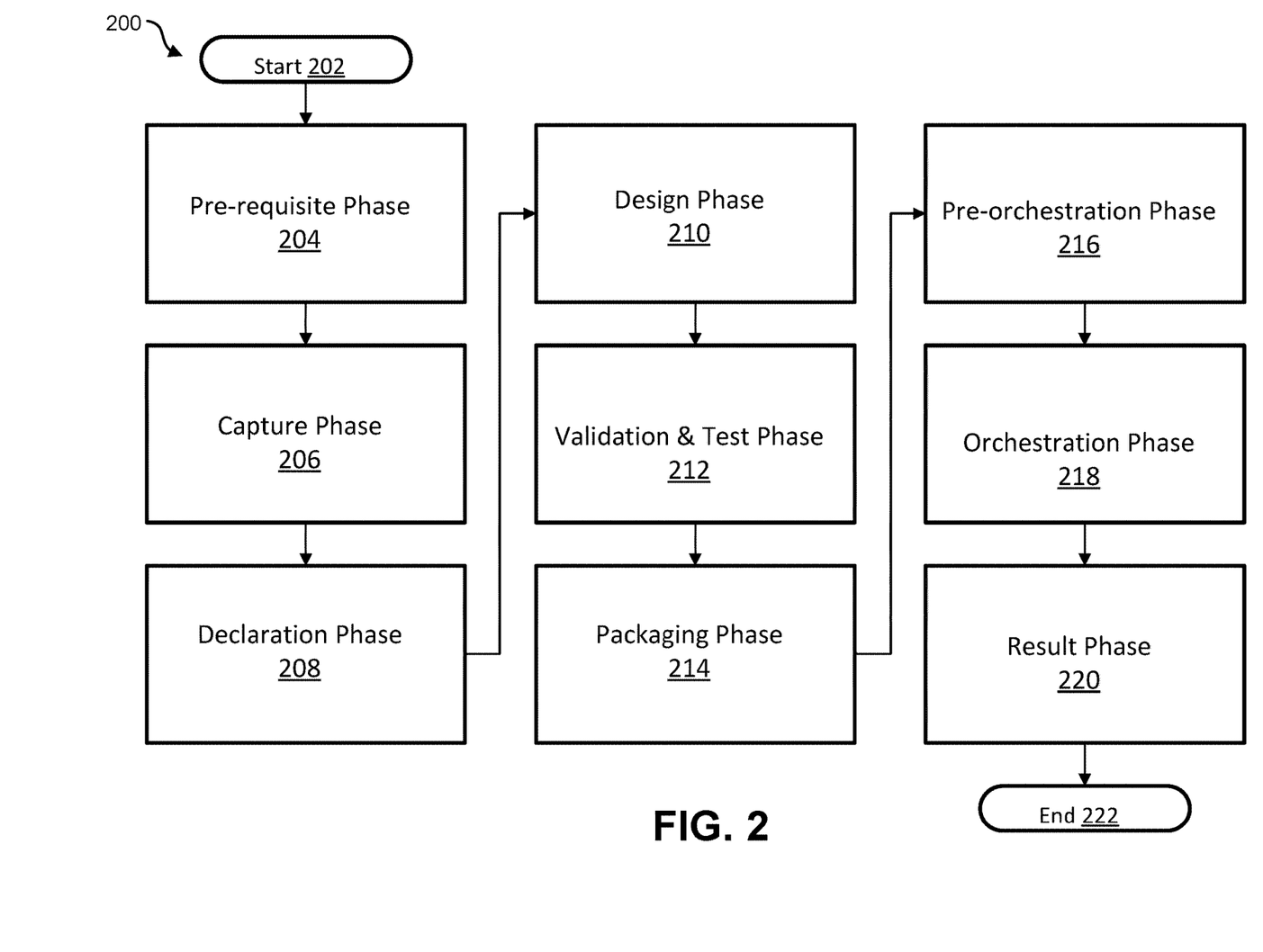
FIG. 2 is a workflow diagram illustrating various phases for automation.

FIG. 2 is a workflow diagram 200 illustrating various phases for automation. The process initiates or starts at 202. During a pre-requisite phase 204, an automation project can be initiated and an application can be launched to capture. During a capture phase 206, application screens and/or user interface (UI) elements can be captured. Application screens and its UI elements can be defined, during a declaration phase 208, which can be used for building an autonomous program. The smart declaration methodologies described herein relate to declaration phase 208. The declared application screens and its UI elements can be used through a workflow or script, during a design phase 210, for covering a regular end-user workflow. During a validation and test phase 212, application screens and its UI elements can be monitored and/or controlled. Additionally, during the validation and test phase 212, the workflow can be played to ensure it is operating as expected. During a packing phase 214, a workable solution can be generated. That workable solution can be imported during the orchestration phase 218. During a pre-orchestration phase 216, a package can be imported. Additionally, during the pre-orchestration phase 216, triggers or start conditions for deployment can be defined. During an orchestration phase, a deployed package can be run based on a trigger. During a result phase 220, one or more execution results of a deployed package can be returned. At 222, the program can end.

Figure 3:
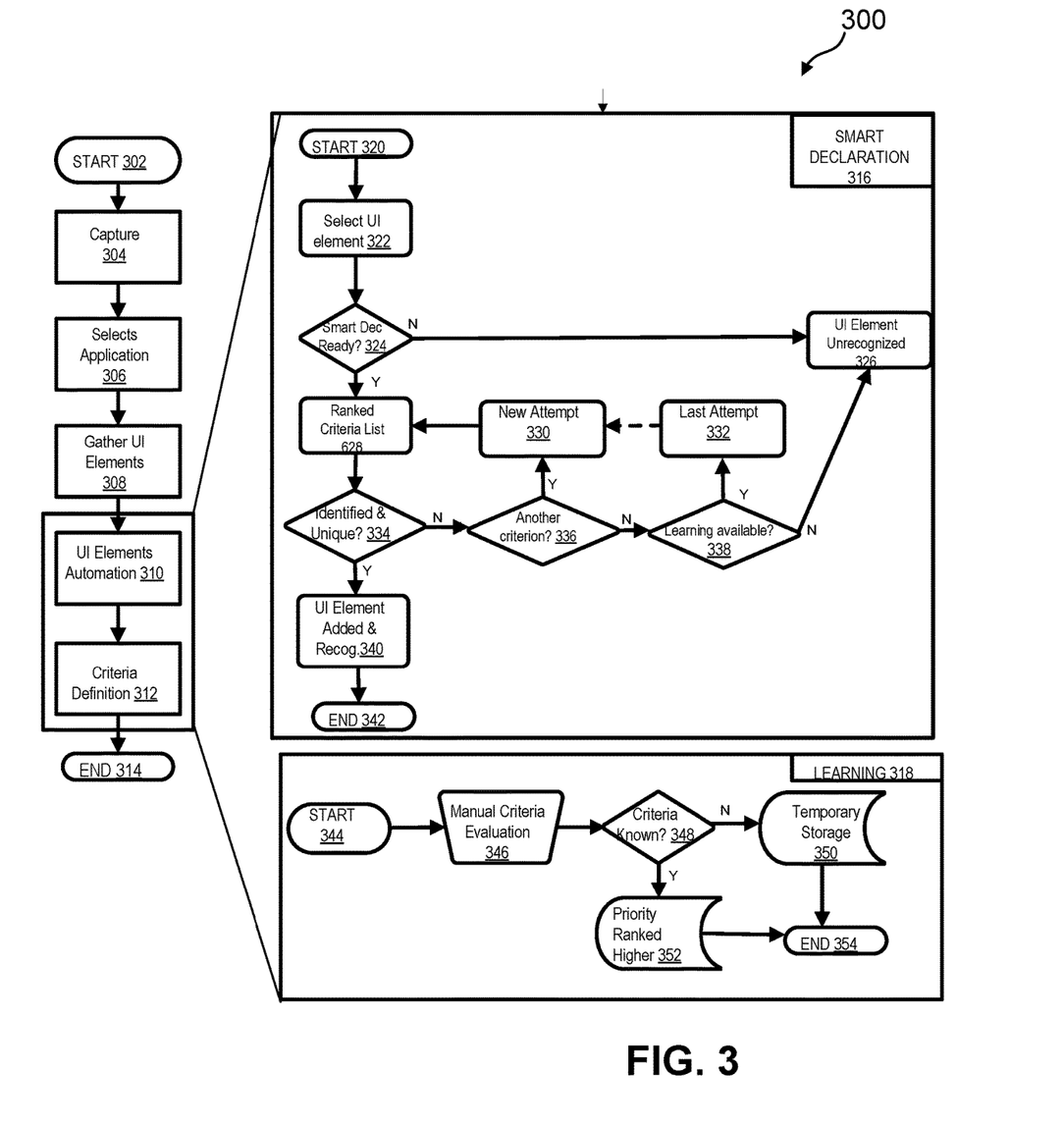
FIG. 3 illustrates a workflow diagram for auto recognition of smart declaration.

FIG. 3 illustrates a workflow diagram 300 for auto recognition of smart declaration. A capture 304 for a particular application can be started at 302. A user can initiate capture 304 for any type of application. By way of example and for ease of understanding, consider a calculator application (e.g., calculator.exe). A user can select the application, at 306, to start the application (e.g., single-click application, double-click application icon, highlight and select application using a keyboard or other input device such as a stylus). The UI elements of the GUI can be gathered, at 308, along with any associated data. The user can then choose various UI elements to add for automation purposes (e.g., UI element automation 310). A user can also define specific criteria to use for the smart declaration and/or learning. A user can also define that all information associated with the UI elements should be used (e.g., all raw data described in more detail in FIGS. 4-5b). After the smart declaration processes 316 and/or learning processes 318 are performed, the declaration phase 208 ends, at 314.

Smart declaration 316 starts at 320. For a given technology and for a given type of UI element (e.g., input field, button, combo box, and the like), a prioritized list of criteria can be evaluated when the user selects a UI element (e.g., clicks on an element using an interface tool such as a mouse or highlights and selects an element using a keyboard). For example, a user can select a UI element, at 322, by clicking on the element or highlighting the element with an input device. It is determined whether the selected UI element is ready for smart declaration, at 324 (e.g., whether the UI element belongs to a ranked criteria list 328). If the UI element does not belong to the ranked criteria list 328, the element is added to the ranked criteria list and denoted as unrecognized, at 326.

If the UI element is recognized as a UI element belonging to a ranked criteria list 328, then it is determined whether the criteria is identifiable and unique, at 334. If the UI element is identified properly, the selected UI element can be added in the list of successfully captured elements, at 340, and denoted as recognized. This listing is described in more detail in FIG. 5B. In order to determine whether a UI element is identified properly, the UI element is evaluated against a first criterion listed on the ranked criteria list 328. If the selected UI element matches the first criterion, then it is identified properly. If the UI element does not match the first criterion, then it is determined whether the ranked criteria list 328 contains another criterion, at 336. If there is another criterion within the ranked criteria list 328, then a new attempt of comparing the selected UI element with that criteria is evaluated, at 330. This process continues for each criterion within the ranked criteria list 328. When all criteria have been cycled through within the ranked criteria list 328, then is determined if learning 318 is available (e.g., whether the user has defined criteria, at 312). If the learning is available (e.g., the user has defined criteria, at 312) then the learning process 318 initiates, at 344. The criteria manually defined, at 312, is evaluated, at 346. It is determined whether that criteria is already known (e.g., the criterion is already within the list of ranked criteria list 328. If the criteria is already in the ranked criteria list 328, then the priority ranking for that criterion is heightened (e.g., the criterion becomes a higher priority) and the learning ends, at 354. If the criterion is not known already, then the user defined criterion is added to the ranked criteria list 32 and a temporary storage 350. The temporary storage 350 stores criteria for as long as space is available or for as long as the application 400 is open. The selected criterion is then evaluated against the new list of criteria 328 (e.g., inclusive of the user defined criteria added through the learning process 318). If learning is unavailable (e.g., the user has not defined criteria), then the selected UI element is added to the ranked criteria list 328 and denoted as unrecognized. The iterative process of checking the ranked criteria list 328 can occur in less than approximately one second. In the case of a previously generated UI identification, such as one previously annotated by prior evaluation or pre-defined by a particular application, the UI identification can be utilized, bypassing the need to evaluate whether the UI element is within the ranked criteria list 328.

Figure 4:
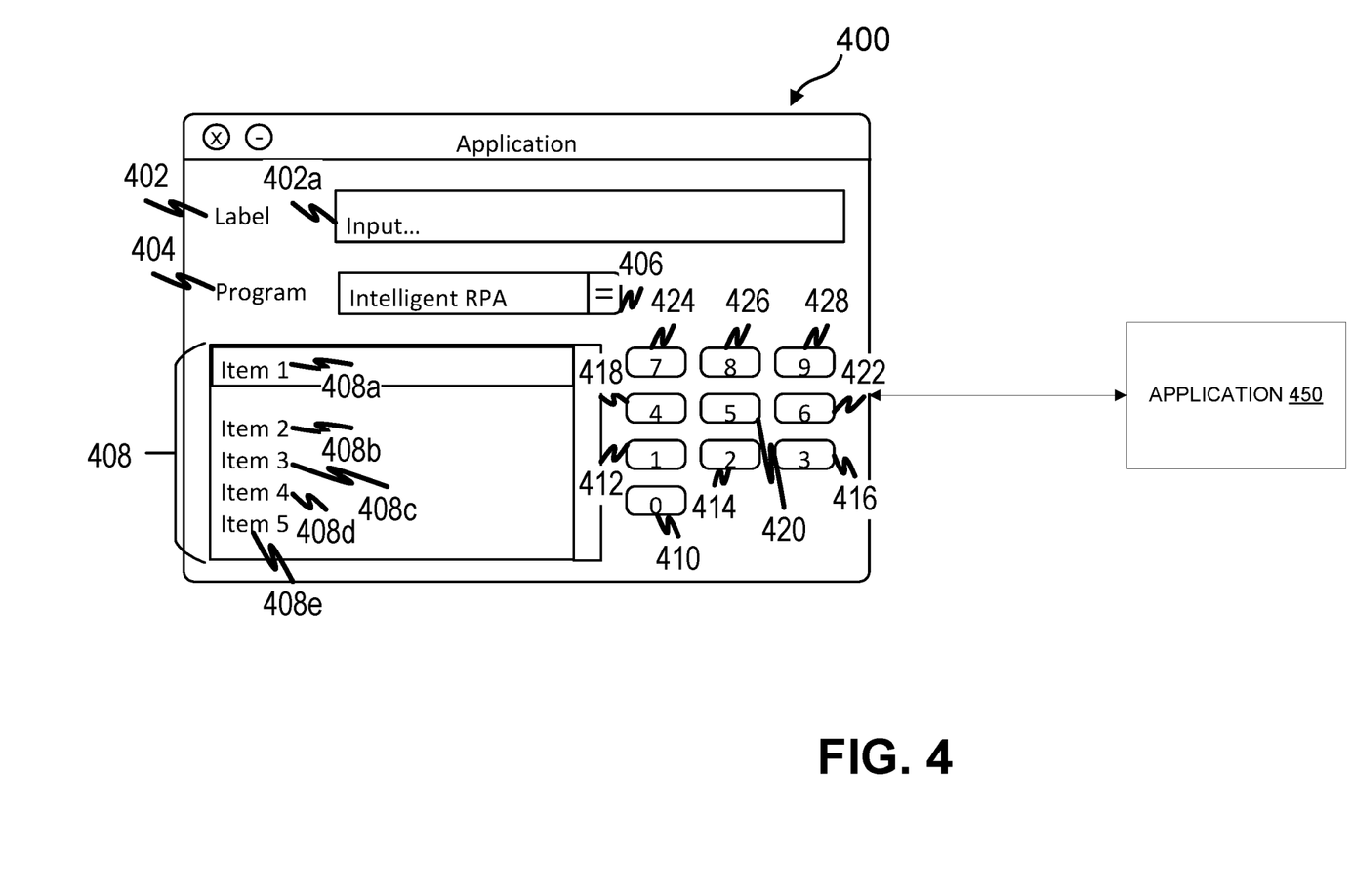
FIG. 4 illustrates an example application for automatic recognition for smart declaration of UI elements.

FIG. 4 illustrates example application 400 and example application 450. Application 450 is an application which is launched by at the initiation of capture 304. Application 450 monitors user interaction with UI elements of another application such as application 400. Application 450 performs the various operations described in FIG. 3 such as smart declaration processes 316 and learning processes 318. The various user sections of UI elements and corresponding data of application 400 are transmitted to application 450. Application 400 is a separate and distinct application from application 450. In other words, application 400 contains one or more GUIs for capturing and application 450 contains the appropriate logic to capture and analyze selections from application 400.

Application 400 contains a "document object model." The document object model includes a listing of UI elements. For example, application 400 can include visible UI elements such as UI element "Label" 402, UI element "Program" 404, UI element "combo box" 406, and UI element "list" 408. UI element "list" 408 can include a number of child elements for each item such as child element "item 1" 408a, child element "item 2" 408b, child element "item 3" 408c, child element "item 4" 408d, and child element "item 5" 408e.

Figure 5A:
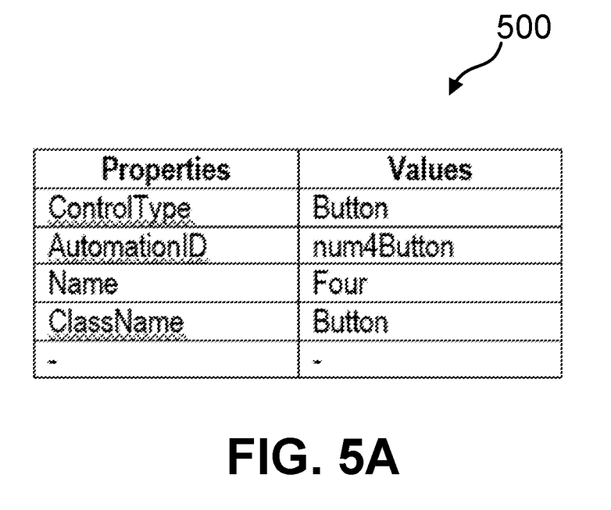
FIG. 5A illustrates an example table of raw data associated with an example UI element.
Figure 5B:
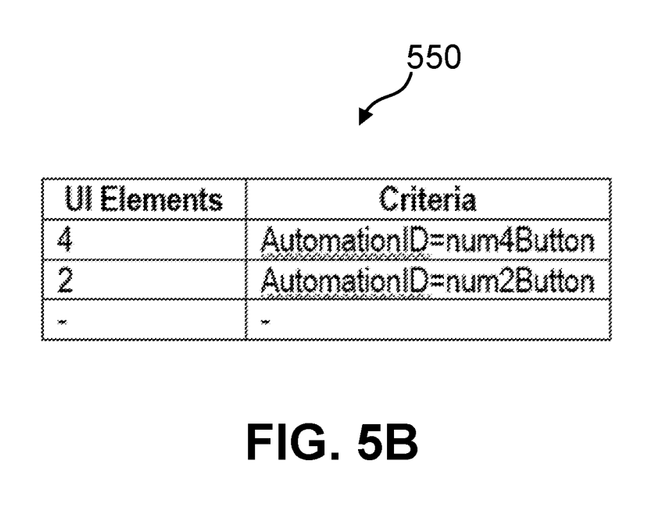
FIG. 5B illustrates an example table of declared UI elements.

Additionally, document object model can include hidden UI elements such as a UI element group for both UI element "Label" 402 and UI element "Input" 402a. Another hidden UI group can include UI element "button 0" 410, UI element "button 1" 412, UI element "button 2" 414, UI element "button 3" 416, UI element "button 4" 418, UI element "button 5" 420, UI element "button 6" 422, UI element "button 7" 424, UI element "button 8" 426, and UI element "button 9" 428. For each UI element that is visible or hidden, a list of properties (e.g., raw data) is also available. Such raw data is illustrated in table 500 of FIG. 5A. For example, the raw data can include a number of properties such as ControlType, AutomationID, Name, and ClassName. In addition to the properties, corresponding values for each property can also be provided for each UI element. For example, the following properties and corresponding names can be associated with UI element "button 4" 418: ControlType—Button, AutomationID—num4Button, Name—Four, ClassName—Button. During declaration phase 208, the UI elements are evaluated. An example table 550 of declared UI elements is illustrated in FIG. 5B. In table 550, continuing with the example raw data of FIG. 5A, parsing of the raw data can result in generating table 550. Table 550 includes specific criteria for the smart declaration. This this example, the specific criteria is the AutomationID. For example, a UI element "button 4" 418 can have an associated criteria defined as "AutomationID=num4Button." Similarly, UI element "button 2" 414 can have a criteria parsed from its corresponding raw data (e.g., AutomationID=num2Button).

The properties within the raw data can be dependent upon the type of application. For example, with web applications, the properties can include Name, ID, Text, and the like. As another example, for WIN32 applications, the properties can include Name, Identification, class, and the like. In other examples, the properties can include GUIGridViewButton, AutomationId, Name or GUICheckBox, Name, and text.

Figure 6:
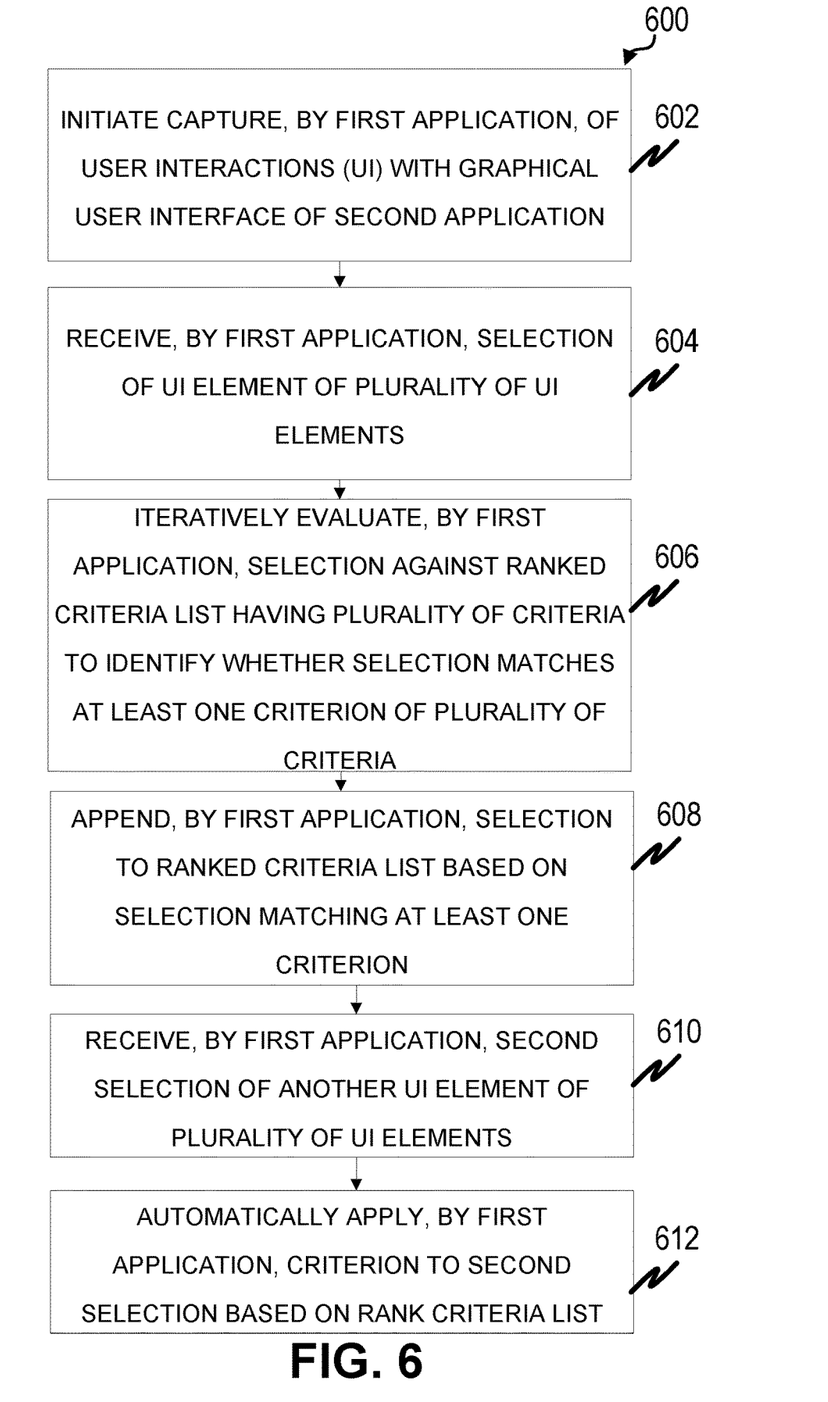
FIG. 6 illustrates a process flow diagram for auto recognition for smart declaration of UI elements.

FIG. 6 illustrates a process flow diagram 600 for auto recognition for smart declaration of UI elements. Capture of user interactions with a GUI of a first application (e.g., application 400) having a plurality of UI elements is initiated, at 602, by a first application (e.g., application 450). A selection of a UI element of the plurality of UI elements is received, at 604. The selection is iteratively evaluated, at 606, against a ranked criteria list having a plurality of criteria to identify whether the selection matches at least one criterion of the plurality of criteria. The selection is appended, at 608, to the ranked criteria list based on the selection matching the at least one criterion. A second selection of another UI element of the plurality of elements is received, at 610. A criterion is automatically applied, at 612, to the second selection based on the rank criteria list.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random access memory associated with one or more physical processor cores.

Figure 7:
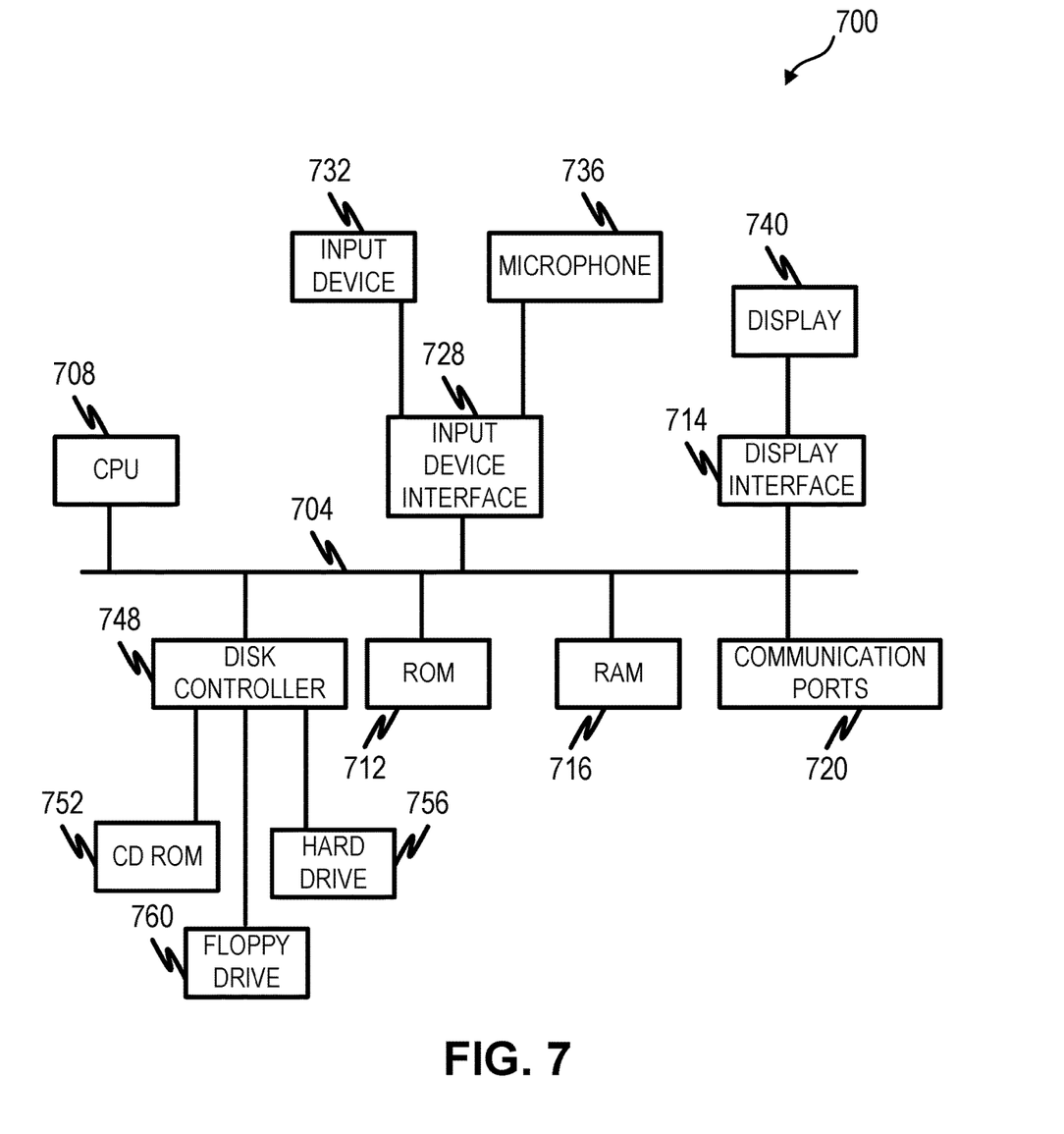
FIG. 7 is a diagram illustrating a sample computing device architecture for implementing various aspects described herein.

FIG. 7 is a diagram 700 illustrating a sample computing device architecture for implementing various aspects described herein. A bus 704 can serve as the information highway interconnecting the other illustrated components of the hardware. A processing system 708 labeled CPU (central processing unit) (e.g., one or more computer processors/data processors at a given computer or at multiple computers), can perform calculations and logic operations required to execute a program. A non-transitory processor-readable storage medium, such as read only memory (ROM) 712 and random access memory (RAM) 716, can be in communication with the processing system 1708 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 748 can interface one or more optional disk drives to the system bus 704. These disk drives can be external or internal floppy disk drives such as 760, external or internal CD-ROM, CD-R, CD-RW or DVD, or solid state drives such as 752, or external or internal hard drives 1756. As indicated previously, these various disk drives 752, 756, 760 and disk controllers are optional devices. The system bus 704 can also include at least one communication port 720 to allow for communication with external devices either physically connected to the computing system or available externally through a wired or wireless network. In some cases, the communication port 720 includes or otherwise comprises a network interface.

To provide for interaction with a user, the subject matter described herein can be implemented on a computing device having a display device 740 (e.g., a CRT (cathode ray tube) or LCD (liquid crystal display) monitor) for displaying information obtained from the bus 704 to the user and an input device 732 such as keyboard and/or a pointing device (e.g., a mouse or a trackball) and/or a touchscreen by which the user can provide input to the computer. Other kinds of input devices 732 can be used to provide for interaction with a user as well; for example, feedback provided to the user can be any form of sensory feedback (e.g., visual feedback, auditory feedback by way of a microphone 736, or tactile feedback); and input from the user can be received in any form, including acoustic, speech, or tactile input. In the input device 732 and the microphone 736 can be coupled to and convey information via the bus 704 by way of an input device interface 728. Other computing devices, such as dedicated servers, can omit one or more of the display 740 and display interface 714, the input device 732, the microphone 736, and input device interface 728.

To provide for interaction with a user, the subject matter described herein can be implemented on a computer having a display device (e.g., a CRT (cathode ray tube) or LCD (liquid crystal display) monitor) for displaying information to the user and a keyboard and a pointing device (e.g., a mouse or a trackball) and/or a touchscreen by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims, is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for automatically recognizing user interface (UI) elements, the method comprising:
    initiating capture, by a first application during a capture phase of building an autonomous program, of user interactions with a graphical user interface (GUI) of a second application, the GUI comprising a plurality of UI elements, wherein the first application is separate and distinct from the second application, wherein automation associated with the building of the autonomous program occurs during a plurality of phases comprising (i) the capture phase, (ii) a declaration phase, and (iii) a validation and test phase;
    receiving, by the first application during the declaration phase of building the autonomous program, a selection of a UI element of the plurality of UI elements of the second application;
    iteratively evaluating, by the first application during the declaration phase, the selection against a ranked criteria list comprising a plurality of criteria to identify whether the selection matches at least one criterion of the plurality of criteria;
    appending, by the first application during the declaration phase, the selection to the ranked criteria list based on the selection matching the at least one criterion;
    receiving, by the first application during the capture phase, a second selection of another UI element of the plurality of UI elements from the second application;

defining, by the first application during the declaration phase, declared UI elements within a document object model for the second application, wherein the declared UI elements include the selection and the second selection; and automatically appending, by the first application during the declaration phase, a criterion to the second selection based on the ranked criteria list.

2. The method of claim 1, further comprising:

receiving a user-defined criterion defining a property and a value;

evaluating whether the user-defined criterion matches at least one criterion of the plurality of criteria;

based on the user-defined criterion matching the at least one criterion, increasing a rank associated with the at least one criterion; and based on the user-defined criterion not matching the at least one criterion, storing the user-defined criterion within a temporary storage device.

3. The method of claim 1, wherein the iteratively evaluating comprises:

comparing the selection against a first criterion of the plurality of criteria to determine whether the selection matches the first criterion.

4. The method of claim 3, further comprising, based on the selection not matching the first criterion, evaluating whether the plurality of criteria comprises a second criterion.

5. The method of claim 4, further comprising, based on a presence of the second criterion, comparing the selection to the second criterion to determine whether the selection matches the second criterion.

6. The method of claim 4, further comprising, based on the plurality of criteria not including the second criterion, (i) determining whether a user-defined criterion is available and (ii) based on the user-defined criterion being unavailable, annotating the selection as unrecognized.

7. The method of claim 1, further comprising bypassing previously generated UI identifications.

8. The method of claim 1, wherein each of the plurality of UI elements comprises a property and a value associated with the property and each criterion of the plurality of criteria comprises a combination of the property and the value.

9. A system for automatically recognizing user interface (UI) elements, the system comprising:

at least one data processor; and memory storing instructions which when executed by the at least one data processor result in operations comprising:

initiating capture, during a capture phase of building an autonomous program, of user interactions with a graphical user interface (GUI) comprising a plurality of UI elements, wherein automation associated with the building of the autonomous program occurs during a plurality of phases comprising (i) the capture phase, (ii) a declaration phase, (iii) a validation and test phase;

receiving, during the declaration phase of building the autonomous program, a selection of a UI element of the plurality of UI elements;

iteratively evaluating, during the declaration phase, the selection against a ranked criteria list comprising a plurality of criteria to identify whether the selection matches at least one criterion of the plurality of criteria;

appending, during the declaration phase, the selection to the ranked criteria list based on the selection matching the at least one criterion;

receiving, during the capture phase, a second selection of another UI element of the plurality of UI elements;

defining, during the declaration phase, by the first application during the declaration phase, declared UI elements within a document object model for the second application, wherein the declared UI elements include the selection and the second selection; and automatically appending, during the declaration phase, a criterion to the second selection based on the ranked criteria list.

10. The system of claim 9, wherein the operations further comprise:

receiving a user-defined criterion defining a property and a value;

evaluating whether the user-defined criterion matches at least one criterion of the plurality of criteria;

based on the user-defined criterion matching the at least one criterion, increasing a rank associated with the at least one criterion; and based on the user-defined criterion not matching the at least one criterion, storing the user-defined criterion within a temporary storage device.

11. The system of claim 9, wherein the iteratively evaluating comprises:

comparing the selection against a first criterion of the plurality of criteria to determine whether the selection matches the first criterion.

12. The system of claim 11, wherein the operations further comprise, based on the selection not matching the first criterion, evaluating whether the plurality of criteria comprises a second criterion.

13. The system of claim 12, wherein the operations further comprise, based on a presence of the second criterion, comparing the selection to the second criterion to determine whether the selection matches the second criterion.

14. The system of claim 12, wherein the operations further comprise, based on the plurality of criteria not including the second criterion, (i) determining whether a user-defined criterion is available and (ii) based on the user-defined criterion being unavailable, annotating the selection as unrecognized.

15. The system of claim 9, wherein the operations further comprise bypassing previously generated UI identifications.

16. The system of claim 9, wherein each of the plurality of UI elements comprises a property and a value associated with the property and each criterion of the plurality of criteria comprises a combination of the property and the value.

17. A non-transitory computer program product storing instructions which, when executed by at least one data processor forming part of at least one computing device, result in operations comprising:

initiating capture, by a first application during a capture phase of building an autonomous program, of user interactions with a graphical user interface (GUI) of a second application, the GUI comprising a plurality of UI elements, wherein the first application is separate and distinct from the second application, wherein automation associated with the building of the autonomous program occurs during a plurality of phases comprising (i) the capture phase, (ii) a declaration phase, (iii) a design phase, and (iv) a validation and test phase;

receiving, by the first application during the declaration phase of building the autonomous program, a selection of a UI element of the plurality of UI elements of the second application;

iteratively evaluating, by the first application during the declaration phase, the selection against a ranked criteria list comprising a plurality of criteria to identify whether the selection matches at least one criterion of the plurality of criteria;

appending, by the first application during the declaration phase, the selection to the ranked criteria list based on the selection matching the at least one criterion;

receiving, by the first application during the capture phase, a second selection of another UI element of the plurality of UI elements from the second application;

defining, by the first application during the declaration phase, declared UI elements within a document object model for the second application, wherein the declared UI elements include the selection and the second selection;

automatically appending, by the first application during the declaration phase, a criterion to the second selection based on the ranked criteria list, wherein the ranked criteria list is used during the design phase.

18. The non-transitory computer program product of claim 17, wherein the operations further comprises:

receiving a user-defined criterion defining a property and a value;

evaluating whether the user-defined criterion matches at least one criterion of the plurality of criteria;

based on the user-defined criterion matching the at least one criterion, increasing a rank associated with the at least one criterion; and based on the user-defined criterion not matching the at least one criterion, storing the user-defined criterion within a temporary storage device.

19. The non-transitory computer program product of claim 17, wherein the iteratively evaluating comprises comparing the selection against a first criterion of the plurality of criteria to determine whether the selection matches the first criterion, and the operations further comprise:

based on the selection not matching the first criterion, evaluating whether the plurality of criteria comprises a second criterion;

based on a presence of the second criterion, comparing the selection to the second criterion to determine whether the selection matches the second criterion; and based on the plurality of criteria not including the second criterion, (i) determining whether a user-defined criterion is available and (ii) based on the user-defined criterion being unavailable, annotating the selection as unrecognized.

20. The non-transitory computer program product of claim 17, wherein each of the plurality of UI elements comprises a property and a value associated with the property and each criterion of the plurality of criteria comprises a combination of the property and the value.

\* \* \* \* \*